United States Patent Office 3,655,786
Patented Apr. 11, 1972

3,655,786
PROCESS FOR PREPARING FLUOROISOBUTYL-ENES AND NOVEL PRODUCT
Everett E. Gilbert and Robert E. A. Dear, Morristown, N.J., assignors to Allied Chemical Corporation, New York, N.Y.
No Drawing. Filed Sept. 10, 1968, Ser. No. 758,689
Int. Cl. C07c 21/18
U.S. Cl. 260—653.3                6 Claims

ABSTRACT OF THE DISCLOSURE

Process for preparing fluoroisobutylenes by reaction of a fluoro tertiary butyl alcohol with sulfur tetrafluoride and a new fluoroisobutylene product. Copolymers of fluoroisobutylenes with other ethylenically unsaturated compounds are useful in the production of elastomeric and resinous compositions.

---

This application relates to a process for preparing fluoroisobutylenes, useful as co-monomers in the preparation of copolymers thereof with other ethylenically unsaturated monomers. The resulting copolymers are useful in the production of a wide variety of elastomeric and resinous compositions. Copolymers of the said fluoroisobutylenes with tetrafluoroethylene are especially useful in the fabrication of a multitude of components adapted for use in the electrical and electronic industries, especially in the production of molded gaskets and packing elements and for such other applications as hydraulic sealing components, back-up sealing cups, O-rings, bearings, piston rings and other miscellaneous components.

Hexafluoroisobutylene, i.e. 3,3,3-trifluoro-2-trifluoromethyl-1-propene, has been prepared in the past by the procedure of Haszeldine described in J. Chem. Soc. (London), page 3567 (1953) wherein 1,1,1,3,3,3-hexafluoro-2-methylpropane is first chlorinated to produce $(CF_3)C(CH_3)Cl \cdot CF_2Cl$, then this compound is dehydrochlorinated with solid potassium hydroxide to produce $(CF_3)(CF_2Cl)C=CH_2$ which is then treated with $SbF_3Cl_2$ to obtain the 3,3,3-trifluoro-2-trifluoromethyl-1-propene. This procedure is unsatisfactory because it involves a multi-step procedure and moreover because dehydrochlorination is difficult since the chlorine atom to be removed is adjacent to a polyfluoroalkyl group and is consequently unreactive and therefore the reaction is extremely slow. Hexafluoroisobutylene has also been prepared by heating hexafluoro-2-methyl-2-propanol at reflux with phosphorus pentachloride for a period of 5 days. This procedure is also unsatisfactory because of the excessively long reaction time required to produce acceptably high yields of product.

It is therefore an object of our invention to provide a process for preparing fluoroisobutylenes which avoids the difficulties and shortcomings of the prior art processes.

A further object of our invention is to provide a process for the production of fluoroisobutylenes which provides good yields in short reaction times.

A still further object is to provide a process for the production of fluoroisobutylenes which requires but a simple one-step reaction.

These and other objects are accomplished according to our invention wherein a mixture of a fluoro tertiary butyl alcohol, as defined hereinafter, and sulfur tetrafluoride is heated at temperatures between about 0° C. and about 200° C., preferably under autogenous pressure, for a period sufficient to cause substantial dehydration of the fluoro tertiary butyl alcohol, and thereafter recovering the fluoroisobutylene product.

The fluorinated isobutylenes which are prepared according to our invention have the formula

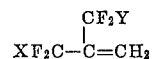

wherein X and Y are the same or difference members of the group consisting of hydrogen and fluorine.

Individual members encompassed by the above formula include (I) Hexafluoroisobutylene, i.e. 3,3,3-trifluoro-2-trifluoromethyl-1-propene, boiling point 14° C. and of the structure

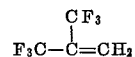

(II) Pentafluoroisobutylene, i.e. 3,3,3-trifluoro-2-difluoromethyl-1-propene, boiling point 36° C. and of the structure

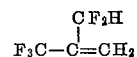

(III) Tetrafluoroisobutylene, i.e. 2,2-difluoro-2-difluoromethyl-1-propene, boiling point 55° C. and of the structure

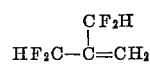

Whereas Compound I, hexafluoroisobutylene is known, compounds II and III, pentafluoro- and tetrafluoroisobutylenes, respectively, are new compounds. Both are useful as co-monomers in the production of elastomeric copolymers as is the hexafluoroisobutylene and one of these novel compounds, III the tetrafluoroisobutylene surprisingly possesses effective utility as nematocidal fumigant, a property not shared by the known hexafluoroisobutylene, nor by the pentafluoroisobutylene.

The process of our invention proceeds according to the following equation:

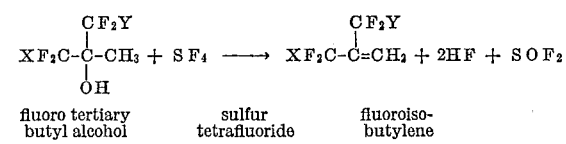

| fluoro tertiary butyl alcohol | sulfur tetrafluoride | fluoroisobutylene | wherein X and Y are as defined above.

In carrying out the process according to our invention, the fluoro tertiary butyl alcohol is placed in a reactor, preferably a pressure reactor. The reactor is closed, cooled below the boiling point of $SF_4$, (−40° C.), for example to −78° C. and evacuated. Then sulfur tetrafluoride gas is condensed into the reactor, for example through a vacuum manifold system. The reactor is then heated at reaction temperature of between about 0° C. and about 200° C., pressures ranging between about 5 p.s.i.g. and about 500 p.s.i.g. Preferably the heating is carried out between about 80° C. and about 120° C., whereupon maximum autogenous pressure of about 200 p.s.i.g. to about 500 p.s.i.g. may develop. The reaction temperature is maintained until the desired degree of reaction has taken place, preferably until the reaction is complete as indicated by substantial cessation of pressure rise, usually a period of not more than about 48 hours even at the lowest reaction temperature the reaction usually proceeding to completion in about 10–18 hours at the preferred reaction temperatures. Pressure per se is not controlling and is utilized as a means of maintaining the desired reaction temperatures.

After completion of the reaction, the hot reactor vapors are released through a series of devices for removing gaseous reaction products, e.g., HF, $SF_4$ and $SOF_2$. The mixture is then finally led through a cold trap at a temperature below the boiling point of the fluoroisobutylene product, to condense and collect the product. The crude fluoroisobutylene product can be treated in conventional manner, for example by distillation, to recover a pure product if desired.

In the dehydration reaction of our invention the $SF_4$ and the fluoro tertiary butyl alcohol react in the molar proportions of 1:1. It is therefore desirable, for effecting complete utilization of the fluoro tertiary butyl alcohol to provide at least one mol of $SF_4$ per mol of fluoro tertiary butyl alcohol charged to the pressure reactor. Excesses of $SF_4$ may be provided, conveniently up to about 20% molar excess since this gaseous reactant is readily recovered for reuse.

Temperature of the reaction is not unduly critical, some slight reaction taking place at temperatures as low as about 0° C. For securing substantial yields in short reaction times we prefer to use temperatures of at least about 40° C. to provide reaction times of not more than about 48 hours. Even higher temperatures promote more rapid reaction and are therefore desirable. Temperatures between about 80° C. and about 120° C. are convenient and usually effect completion of the reaction in about 10 to 18 hours and are therefore preferred. Temperatures up to about 200° C. can be used and provide complete reaction in shorter times, as low as about 2 hours at 200° C. These higher temperatures however, give rise to higher autogenous pressures up to e.g. ca. 800 p.s.i.g., and are therefore less desirable from an operating point of view than the lower temperatures and pressure. Moreover, temperatures higher than about 200° C. are undesirable as they tend to cause polymerization of the olefinic product.

Time of reaction is in general dependent on the temperature, as brought out above. In any event reaction is usually substantially complete in periods of not more than about 48 hours, usually in periods between about 10 hours and about 18 hours.

The production of the fluoroisobutylenes by heating with $SF_4$ is surprising as it was expected that this reaction would yield the corresponding saturated fluorobutane

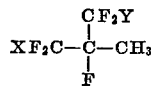

by simple replacement of the hydroxyl group by fluorine.

The reaction described herein is further surprising in that it is selective to the compounds wherein X and Y are fluorine or hydrogen, and does not take place when either one or both of X and Y are chlorine. In the latter case, rearrangement occurs whereby one chlorine atom of the fluorochloro tertiary butyl alcohol migrates to the central carbon and the original OH terminates as a fluorine atom in the position originally occupied by the chlorine atom.

The following specific examples further illustrate our invention. Parts are by weight, except as otherwise noted.

EXAMPLE 1

Into a stainless steel pressure reactor was charged 50 grams (0.275 mol) of 3,3,3-trifluoro-2-trifluoromethyl-2-propanol. The reactor was closed, cooled to −78° C., and all gaseous matter was evacuated. Then 41 grams of technical sulfur tetrafluoride gas, containing a total of 0.35 mol of $SF_4$ was condensed into the reactor through a vacuum manifold system. The reactor was then heated at 90–95° C. for 18 hours. At the end of this time the interior pressure had reached 325 p.s.i.g. The hot vapors thus produced were released through a number of devices connected in series including (a) an empty trap, (b) a water scrubber, (c) a caustic soda scrubber, (d) a drying tower (filled with $CaSO_4$) and (e) a trap cooled to −78° C. wherein the hexafluoroisobutylene, i.e. 3,3,3-trifluoro-2-trifluoromethyl-1-propene was collected. Any accompanying HF, $SO_2F$ and excess $SF_4$ was removed by traps (b) and (c). The collected product weighed 32.5 grams equivalent to a yield of 72% based on the hexafluoro-2-methyl-2-propanol. It had a boiling point of 14° C. It was subjected to infrared and nuclear magnetic resonance spectroscopy which confirmed its structure as

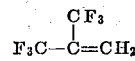

variously called 3,3,3-trifluoro-2-trifluoromethyl-1-propene or 1,1-bis(trifluoromethyl)ethylene or hexafluoroisobutylene.

EXAMPLE 2

In the same manner as that described in Example 1, 50 grams of 3,3,3-trifluoro-2-difluoromethyl-2-propanol of 98% purity (0.343 mol) was reacted with 40 grams of $SF_4$ gas (containing about 0.352 mol of $SF_4$). The mixture was heated at 90° C.–92° C. for 16 hours, the pressure rising to 265 p.s.i.g. The reactor was then cooled, opened and the contents poured onto about 100 grams of crushed ice. The resulting liquid product, pentafluoroisobutylene, i.e. 3,3,3-trifluoro-2-difluoromethyl-1-propene boiling at 36° C.–38° C. was obtained in the amount of 22 grams equivalent to a yield of 34.7% of theoretical based on consumed alcohol. Elemental analysis, infrared and nuclear magnetic resonance spectroscopy confirmed its structure:

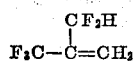

Elemental analysis is shown below:
Calculated (percent): C, 32.88; H, 2.07. Found (percent): C, 32.86; H, 2.19.

EXAMPLE 3

In the same manner as that described in Example 1, 35 grams (0.24 mol) of 3,3-difluoro-2-difluoromethyl-2-propanol was reacted with 30 grams of technical $SF_4$ (containing about 0.26 mol $SF_4$). The mixture was heated at 95° C. for 16 hours, the pressure rising to 245 p.s.i.g. The reactor was then cooled, opened and the liquid product was poured onto crushed ice, and the lower organic layer was separated. Examination by gas chromatography showed no alcohol remaining. The liquid product was distilled and yielded 11.8 grams of tetrafluoroisobutylene, i.e. 3,3-difluoro-2-difluoromethyl-1-propene, boiling point 55° C. equivalent to a yield of 38.4% based on the alcohol. The structure

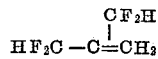

was verified by infrared and nuclear magnetic resonance spectroscopy. Elemental analysis showed:
Calculated (percent): C, 37.50; H, 3.15. Found (percent): C, 37.58; H, 3.30.

EXAMPLE 4

The fluoroisobutylenes of Examples 1–3 inclusive were tested for effectiveness in fumigant control of nematodes (Panagrellus redivivus) by placing 100 nematodes in each of three petri dishes containing 5 ml. of distilled water. The dishes were each placed open in a gallon Mason jar. About 0.06 ml. of the test compound (equivalent to 1 pound of test compound 1000 cubic feet of air) was placed in the jar on a cellucotton wad or in a small open container. When the nematode container and the test compound were in place, the jar was sealed. After three days' exposure, the nematode container was removed, and a mortality count was made. Results of this test carried out on the compounds of Examples 1-3 together with a check run in which no toxicant was used, are shown in Table I below:

Table I.—Nematode fumigant tests

| Compound of example: | Percent kill |
|---|---|
| (1) $(CF_3)_2C=CH_2$ | 5-10 |
| (2) $(CF_3)(CF_2H)C=CH_2$ | 10-15 |
| (3) $(CF_2H)_2C=CH_2$ | 100 |
| No toxicant | 5-10 |

It is apparent from Table I that the tetrafluoroisobutylene of Example 3 is a very effective nematocidal fumigant, whereas the pentafluoroisobutylene of Example 2, and the known compound hexafluoroisobutylene, prepared according to Example 1, were ineffective, exhibiting about the same effect as the test in which no toxicant was included.

While the foregoing describes the preferred embodiments of our invention, it will be understood that departures can be made therefrom within the scope of the specification and claims.

We claim:

1. The process for preparing fluoroisobutylenes of the formula:

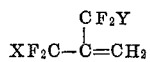

wherein X and Y are the same or different members of the group consisting of hydrogen and fluorine, which comprises reacting a mixture of sulfur tetrafluoride and a fluoro tertiary butyl alcohol of the formula

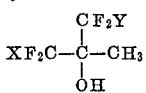

wherein X and Y are as defined above at temperatures between about 0° C. and about 200° C. and recovering the resulting fluoroisobutylene.

2. The process according to claim 1 wherein the quantity of sulfur tetrafluoride in the mixture is at least 1 mol per mol of fluoro tertiary butyl alcohol.

3. The process according to claim 1 wherein the reaction is carried out at temperatures between about 80° C. and about 120° C., and under autogenous pressure.

4. The process according to claim 1 wherein the fluoro tertiary butyl alcohol is hexafluoro tertiary butyl alcohol.

5. The process according to claim 1 wherein the fluoro tertiary butyl alcohol is pentafluoro tertiary butyl alcohol.

6. The process according to claim 1 wherein the fluoro tertiary butyl alcohol is tetrafluoro tertiary butyl alcohol.

References Cited

UNITED STATES PATENTS

| 3,419,628 | 12/1968 | Kaufman et al. | 260—653.3 |
| 3,459,817 | 8/1969 | Dear et al. | 260—653.3 |
| 3,472,905 | 10/1969 | Lichstein et al. | 260—653.3 |

DANIEL D. HORWITZ, Primary Examiner

U.S. Cl. X.R.

260—900; 277—237